United States Patent [19]

Caffrey

[11] 4,186,767

[45] Feb. 5, 1980

[54] BLEED VALVE PARTICULARLY FOR A MULTI-STAGE COMPRESSOR

[75] Inventor: Terence Caffrey, Kent, Ohio

[73] Assignee: Davey Compressor Company, Cincinnati, Ohio

[21] Appl. No.: 927,669

[22] Filed: Jul. 24, 1978

Related U.S. Application Data

[60] Continuation of Ser. No. 820,208, is a division of Ser. No. 644,539, Dec. 29, 1975, abandoned.

[51] Int. Cl.² .............................................. G05D 7/01
[52] U.S. Cl. .................................................... 137/501
[58] Field of Search ................................ 137/501, 504

[56] References Cited

U.S. PATENT DOCUMENTS

| | | | |
|---|---|---|---|
| 316,626 | 4/1885 | Jackson | 137/501 |
| 2,592,380 | 4/1952 | Beckett | 137/501 |
| 2,704,553 | 3/1955 | Verteuil | 137/504 X |
| 3,023,591 | 3/1962 | Tilney | 137/501 X |
| 3,028,876 | 4/1962 | Gratzmuller | 137/501 |

Primary Examiner—Robert G. Nilson
Attorney, Agent, or Firm—Kinney & Schenk

[57] ABSTRACT

A multi-stage compressor has a trap between adjacent stages to collect moisture from the compressed air passing from the exit of one compression stage to the entrance of the next compression stage. Each of the traps communicates with the next of the preceding traps through a bleed valve whereby moisture passes from one trap to another without having any effect on the substantial pressure differential between the two traps. The bleed valve has a diaphragm within a housing to divide the housing into first and second chambers with the first chamber communicating with the high pressure side trap and the second chamber communicating with the low pressure side trap. The flow from the high pressure side trap to the first chamber and the second chamber is controlled so that a predetermined pressure differential of one p.s.i. is maintained across the diaphragm.

7 Claims, 2 Drawing Figures

BLEED VALVE PARTICULARLY FOR A MULTI-STAGE COMPRESSOR

This is a continuation of application Ser. No. 820,208, filed July 29, 1977, now abandoned, which is in turn a division of application Ser. No. 644,539, filed Dec. 29, 1975, now abandoned.

When a multi-stage air compressor is utilized for starting an aircraft jet engine, it is necessary that there be no moisture in the high pressure air supplied to the starter of the jet engine. A four-stage compressor can increase the air from atmospheric pressure to 3,500 p.s.i. when it is supplied to the starter of the jet engine, and this can produce a significant amount of moisture depending on the moisture in the air.

The amount of moisture in the air depends upon the climate. That is, in humid areas, there is a very large quantity of moisture in the air while a dry climate has partically no moisture in the air. Since aircrafts fly to all types of climates, it is necessary for the multi-stage compressor, which is utilized to supply compressed air to the starter of the aircraft jet engine, to be capable of supplying the compressed air without moisture therein beyound a very limited amount.

If moisture is in the compressed air supplied to the starter of the jet engine, the starter will eventually fail because of corrosion produced by the moisture. This necessitates the expense and time of tearing down the jet engine and replacing damaged parts. It also prevents use of the aircraft until a replacement engine is provided or the engine is repaired.

It has previously been suggested to utilize valves for venting the traps, which are disposed between the various stages of a multi-stage compressor and in which the moisture in the compressed air has been trapped. However, the exposure to the weather of any type of automatic actuating means such as an electrical actuator or an electrical timer for a mechanical actuator has caused them to become inoperative at times. Since it is necessary to actuate the valves for a predetermined period of time at predetermined time intervals or the moisture will pass from the outlet of the multi-stage compressor to the starter of the jet engine, the failure of these automatic mechanisms to function properly has resulted in moisture reaching the starter of the jet engine and causing damage thereto.

It also has previously been suggested to manually actuate a vent valve on each trap to avoid the difficulties from the failures of the automatic mechanisms. However, this requires the user to remember when the valve has previously been opened. This is sometimes forgotten and the water reaches the jet engine starter before the user is aware of this. This again results in damage to the engine.

Furthermore, because of the relatively high pressure existing in the final stages of a multi-stage compressor, this pressure is supersonic when it escapes through the vent valve. As a result, a blast of noise is produced when the vent valve is opened, and this is not desirable.

The present invention satisfactorily overcomes the foregoing problems through providing an arrangement for a multi-stage compressor in which there is no requirement for any external power for automatic control mechanisms. Thus, the possible failure of the electrical actuators or electrical timers, for example, is eliminated.

The present invention accomplishes this through utilizing a bleed valve between traps of adjacent stages.

The bleed valve enables bleeding from one trap to the next of the moisture and/or the air without having any substantial effect on the pressure in any of the stages. Air flows through the valve when the amount of moisture is less than the flow quantity for which the valve is designed.

The present invention prevents the high pressure trap from communicating with the low pressure trap except through a chamber, which is at a predetermined pressure above the low pressure side, in a housing of the bleed valve. This is a very slight pressure differential such as one p.s.i., for example.

Thus, moisture can flow from one trap to the other without having any effect on the high pressure stage or the low pressure stage with which the traps communicate. Similarly, if there is no moisture because the multi-stage compressor is being utilized in a very dry climate, the amount of air, which flows from one trap to another because of the absence of moisture and oil, does not produce any significant effect on the pressure on the high pressure stage since there is only a loss of one p.s.i.

If only an orifice were utilized between the traps, its size would have to be so small to prevent a significant air pressure loss when there is no moisture in the compressed air that it would not be able to pass a sufficient quantity of moisture when operating in a humid climate. Thus, while an orifice could be utilized to provide a desired pressure differential between the traps, it would not be capable of passing the large amount of moisture produced from the compressed air when the multi-stage compressor is employed in a wet climate. Similarly, if the orifice were big enough to handle the flow of moisture produced from the compressed air when the multi-stage compressor is used in a wet climate, it would allow the flow of too large a quantity of air in a very dry climate where there is parctically no moisture in the air to decrease the pressure of the high pressure side too much.

An object of this invention is to provide a bleed valve.

Another object of this invention is to provide an arrangement for bleeding moisture and/or air from a multi-stage compressor.

Other objects, uses, and advantages of this invention are apparent upon a reading of this description, which proceeds with reference to the drawing forming part thereof and wherein.

Figure 1:
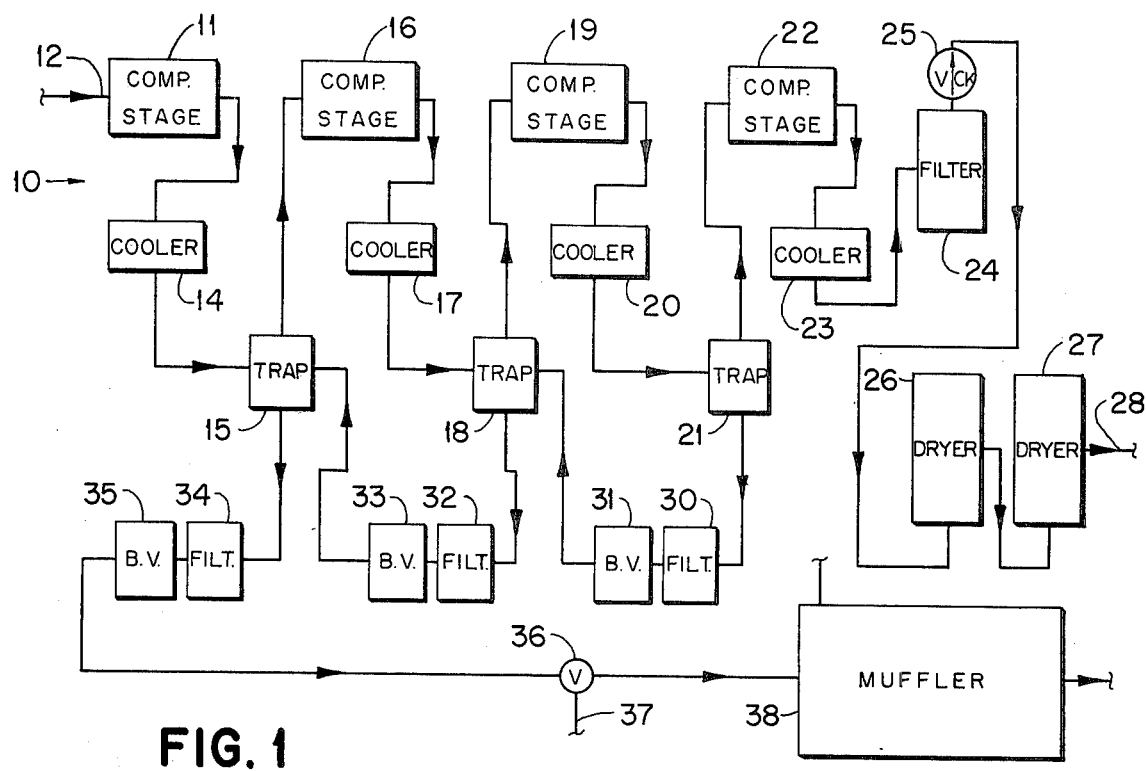
FIG. 1 is a schematic view of a multi-stage compressor utilizing the bleed valve of the present invention.

Referring to the drawing and particularly FIG. 1, there is shown a four-stage compressor 10 having atmospheric air supplied to a first compression stage 11 through an inlet line 12. The first compression stage 11 increases the temperature of the air approximately 200° F. while decreasing the output volume to about 25% of the entering volume. This compressed air flows from the first compression stage 11 through a cooler 14.

The cooler 14 reduces the temperature of the air to about 30° F. above ambient temperature. As a result, the cooler 14 condenses any moisture in the compressed air and any oil, which may have passed from the first compression stage 11.

The cooler 14 is connected to a trap 15 in which the condensed moisture and oil are collected while the compressed air passes therethrough to a second compression stage 16. The air is compressed in the second compression stage 16 so that the exit volume is reduced to 25% of that of its entry while the temperature of air is increased approximately 200° F.

The outlet of the second compression stage 16 is connected to a cooler 17, which is the same as the cooler 14. The cooler 17 reduces the temperature of the compressed air to approximately 30° F. above ambient temperature while condensing any moisture in the compressed air and any oil, which may have passed through the second compression stage 16.

The air flows from the cooler 17 to trap 18, which is the same as the trap 15, wherein the condensed moisture and oil are trapped or collected while the compressed air flows to the inlet of a third compression stage 19. The air is increased in pressure in the third compression stage 19 through having its output volume reduced to approximately 25% of its entering volume while its temperature is increased approximately 200° F.

The outlet of the third compression stage 19 is connected to a cooler 20, which is the same as the coolers 14 and 17. The cooler 20 reduces the temperature of the compressed air to about 30° F. above ambient temperature. This redults in condensing of any moisture within the compressed air and any oil, which may have passed through the third compression stage 19.

The cooler 20 communicates with a trap 21, which is the same as the traps 15 and 18, in which the condensed moisture and oil are collected while the compressed air flows therefrom to a fourth compression stage 22. The fourth compression stage 22 reduces the exit volume to approximately 25% of the entering air volume while increasing the temperature about 200° F. When the compressed air exits from the fourth compression stage 22, its pressure is about 3500 p.s.i.

The compressed air flows from the fourth compression stage 22 to a cooler 23, which is the same as the coolers 14, 17, and 20. The cooler 23 reduces the temperature of the air to approximately 30° F. above ambient temperature. This results in condensing of any moisture in the compressed air and any oil, which may have passed through the fourth compression stage 22.

The cooler 23 communicates with a separator 24 in which the condensed moisture and air are removed from the compressed air. The compressed air flows from the separator 24 through a check valve 25 to a chemical dryer 26, which is a chemical absorber. The chemical dryer 26 communicates with a second chemical dryer 27, which is also a chemical absorber. The compressed air flows from the chemical dryer 27 through an outlet line 28 for supply to the starter of the aircraft jet engine, for example.

During the passage of the compressed air through the chemical dryers 26 and 27, any moisture remaining in the compressed air is removed. However, the chemical dryers 26 and 27 are capable of absorbing only a small amount of moisture so that the moisture must be removed by the traps 15, 18, and 21 and the separator 24 in a sufficient quantity prior to the compressed air passing through the check valve 25 to the chemical dryers 26.

The trap 21 is connected through a filter 30, which is a strainer for solid particles, and a bleed valve 31 to the trap 18. The bleed valve 31 enables the moisture and oil to pass from the trap 21, which is at the pressure at the entrance to the third compression stage 19, without having any effect on the pressure at the entrance of either compression stage.

The trap 18 is connected to the trap 15 through a filter 32 and a bleed valve 33, which is the same as the bleed valve 31. The filter 32 is a strainer for solid particles in the same manner as the filter 30. The bleed valve 33 is the same as the bleed valve 31 and enables the flow of moisture and oil from the trap 18 to the trap 15 without having any effect on the pressures at the entrance to the third compression stage 19 and the entrance to the second compression stage 16.

The trap 15 has the moisture and oil flow therefrom through a filter 34, which is a strainer for solid particles and is the same as the filter 32, to a bleed valve 35, which is the same as the bleed valves 31 and 33. The pressure at the entrance to the second compression stage 16 is not affected even though the bleed valve 35 communicates through a valve 36 to the atmosphere by a drain 37 or to the atmosphere by a muffler 38, which is at a rather high temperature due to receiving the exhaust gases for the engine dirving the compression stages 11, 16, 19, and 22 so as to vaporize the moisture and oil. It should be understood that any moisture and oil from the separator 24 also is supplied to the muffler 38 through a drain valve (not shown) and a condensate receiver (not shown).

Figure 2:
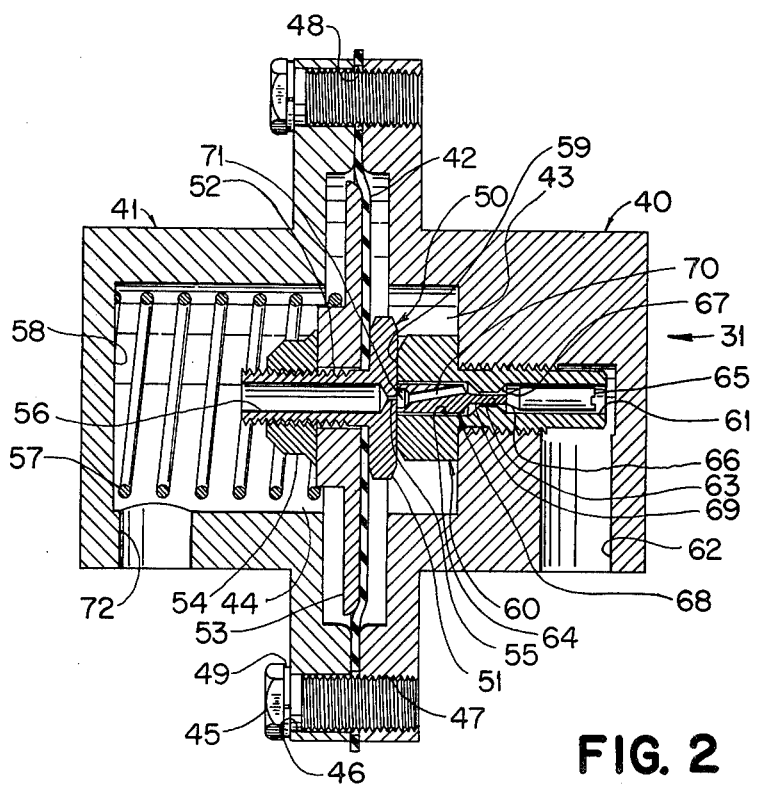
FIG. 2 is a sectional view of the bleed valve of the present invention.

Referring to FIG. 2, the bleed valve 31 includes a housing formed of portions 40 and 41 having a diaphragm 42 extending therebetween. The diaphragm 42 divides the housing into a first chamber 43 within the housing portion 40 and a second chamber 44 within the housing portion 41.

The housing portions 40 and 41 are secured to each other by screws 45. Each of the screws 45 passes through an enlarged passage 46 in the housing portion 41 and into a threaded passage 47 in the housing portion 40. The diaphragm 42 has openings 48 therein to receive the screws 45. A lock washer 49 is disposed between the head of each of the screws 45 and the housing portion 41.

A bolt 50 is mounted in the diaphragm 42 and has its head 51 disposed within the first chamber 43. The bolt 50 has its threaded portion 52 extending into the second chamber 44 through a plate 53, which provides support to the diaphragm 42. The threaded portion 52 of the bolt 50 receives a nut 54 to hold the head 51 of the bolt 50 and the plate 53 against opposite sides of the diaphragm 42.

The bolt 50 has an orifice 55 in the head 51. The orifice 55 communicates with an enlarged passage 56 extending through the remainder of the bolt 50 to provide communication between the first chamber 43 and the second chamber 44.

The second chamber 44 has a spring 57 mounted therein to continuously urge the diaphragm 42 towards the first chamber 43. The spring 57 has one end engaging a wall 58 of the housing portion 41 and its outer end contacting the plate 53.

The spring 57 urges the head 51 of the bolt 50 against a surface 59 of a member 60, which is threaded within a passage in the housing portion 40. The member 60 has a passage 61 communicating with an inlet 62 in the housing portion 40. The member 60 has a reduced passage 63, which communicates with the passage 61 and a passage 64 in the member 60. Accordingly, the inlet 62, which is connected to the higher pressure through the filter 30 to the trap 21, communicates with the first chamber 43 through the passages 61, 63, and 64 in the member 60.

A valve body 65 is slidably disposed within the passage 61 and is of slightly smaller diameter than the diameter of the passage 61. Accordingly, when the valve body 65 has its tapered portion 66 spaced from a seat 67 in the member 61 as shown in FIG. 2, fluid can flow between the outer surface of the valve body 65 and the inner surface of the passage 61.

The passage 64 in the member 60 has a plunger 68 slidably mounted therein with its stem 69 disposed within the reduced passage 63 in the member 60 and engaging the end of the valve body 65. The stem 69 is of smaller diameter than the diameter of the passage 63 in the member 60 so that fluid can flow therebetween into the passage 64. The plunger 68 is smaller in diameter than the passage 64 so that fluid can flow therebetween into the passage 64. The plunger 68 is smaller in diameter than the passage 64 so that fluid can flow therebetween.

The plunger 68 has a passage 70 formed therein communicating with the passage 64. Thus, the fluid, which passes between the stem 69 and the reduced passage 63, can enter the passage 70, which has an enlarged end portion 71, to act against the head 51 of the bolt 50 and also flow through the orifice 55 and the enlarged passage 56 to the second chamber 44. The fluid also flows between the outer surface of the plunger 68 and the inner surface of the passage 64.

Accordingly, when the high pressure fluid from the inlet 62 is acting against the head 51 of the bolt 50, the force of the spring 57 is overcome so that the fluid from the inlet 62 enters the first chamber 43 and also flows from the inlet 62 through the passage 70 in the plunger 68 and the orifice 55 and the passage 56 in the bolt 50 to the second chamber 44 from which the fluid exits through an outlet 72. While the outlet 72 is shown in the same angular position relative to the longitudinal axis of the housing as the inlet 62 in FIG. 2, it should be understood that the outlet 72 is actually spaced 120° clockwise (as viewed from the right end of FIG. 2) from the inlet 62.

The force of the spring 57 is selected so that the diaphragm 42, which is a flexible member, flexes and moves in response to the pressure in the first chamber 43 as soon as a predetermined pressure differential exists between the first chamber 43 and the second chamber 44. As the diaphragm 42 flexes towards the second chamber 44 and against the force of the spring 57, the plunger 68 follows the movement of the head 51 of the bolt 50. This is because the force of the high pressure fluid acting on the valve body 65 causes the end of the valve body 65 to push against the stem 69 of the plunger 68 so that the plunger 68 follows the motion of the bolt 50.

As the diaphragm 42 moves away from the first chamber 43, the tapered portion 66 of the valve body 65 engages the seat 67 to stop flow from the inlet 62 to the first chamber 43. At the same time, the plunger 68 extends beyond the end surface of the member 60.

When the valve body 65 engages the seat 67, the pressure in the first chamber 43 decreases because of the lack of any further supply of fluid from the inlet 62 while fluid flows from the first chamber 43 into the space between the outer surface of the plunger 68 and the inner surface of the passage 64 in the member 60 and through the passage 56 to the second chamber 44. This reduction in the pressure in the first chamber 43 causes the spring 57 to move the diaphragm 42 towards the first chamber 43 whereby the plunger 68 is moved into the passage 64 in the member 60 so that the stem 69 of the plunger 68 moves the tapered portion 66 of the valve body 65 away from the seat 67 to cause the valve body 65 to be in its open position. This allows the high pressure fluid from the inlet 62 to again flow into the first chamber 43 to again increase the pressure therein.

During the time that the high pressure fluid is flowing from the inlet 62 into the first chamber 43 to increase the pressure therein, fluid is continuing to flow through the outlet 72 because of fluid flowing from the inlet 62 through the space between the outer surface of the valve body 65 and the inner surface of the passage 61, the reduced passage 63, and the passage 70 in the plunger 68 to the orifice 55 in the bolt 50. Thus, there is always communication of fluid to the second chamber 44 from either the inlet 62 or the first chamber 43 depending on the position of the diaphragm 42.

When the pressure in the first chamber 43 increases sufficiently, the diaphragm 42 moves the head 51 of the bolt 50 away from the end surface 59 of the member 60. This results in the valve body 65 again moving to its closed position because of the plunger 68 following the movement of the bolt 50. When this occurs, flow is again from the first chamber 43 to the second chamber 44 until the pressure differential becomes sufficient to hold the diaphragm 42 in the position in which the valve body 65 is in its closed position.

Accordingly, the valve body 65 initially reciprocates between its open and closed positions because of the reciprocating motion of the plunger 68 due to the flexing of the diaphragm 42. This flexing of the diaphragm 42 is due to the pressure differential between the first chamber 43 and the second chamber 44 as set by the force of the spring 57.

However, movement of the valve body 65 to a fully closed or fully open position ceases after initial hunting. Thus, the tapered portion 66 of the valve body 65 remains slightly spaced from the valve seat 67 to allow a slight amount of flow from the inlet 62 through the passage 70 in the plunger 68 to the orifice 55 in the bolt 50. There also is some flow through the space between the outer surface of the plunger 68 and the inner surface of the passage 64 in the member 60 into the first chamber 43 to hold the first chamber 43 at the predetermined pressure differential with respect to the second chamber 44.

Considering the operation of the bleed valve 31, the parts of the bleed valve 31 are disposed as shown in FIG. 2 when there is no fluid supplied to the inlet 62. As soon as fluid is supplied to the inlet 62, it flows through the orifice 55 and the passage 56 in the bolt 50 to the outlet 72 and also acts on the head 51 of the bolt 50 to move it away from the end surface 59 of the member 60.

When the head 51 of the bolt 50 is moved away from the end surface 59 of the member 60, the valve body 65 is moved to its closed position. This is when the pressure differential across the diaphragm 42 is one p.s.i. If desired, the spring 57 could have its force set to be responsive to any other desired predetermined pressure differential.

With the head 51 of the bolt 50 moved away from the end surface 59 of the member 60, the flow is no longer from the inlet 62 through the passage 70 in the plunger 68 and the orifice 55 and the passage 56 in the bolt 50 to the second chamber 44 and then to the outlet 72 but is from the first chamber 43 through the passage 70 in the plunger 68 and the orifice 55 and the passage 56 in the bolt 50 to the second chamber 44 from which it flows to the outlet 72. The flow of fluid from the first chamber 43 reduces the pressure so that the spring 57 again returns the head 51 of the bolt against the end surface 59 of the member 60 to cause the valve body 65 to be moved to an open position by the stem 69 of the plunger 68 whereby pressurized fluid flows from the inlet 62 to pass through the orifice 55 and the passage 56 to the second chamber 44 and to again raise the head 51 of the bolt 50 away from the end surface 59 of the member 60.

After the initial hunting occurs, the valve body 65 remains in a position in which it is always open to a slight degree to allow fluid to flow through the passage 70 in the plunger 68, the orifice 55, and the passage 56 to the second chamber 44. At the same time, because the valve body 65 is only slightly open, the valve body 65 holds the plunger 68 in a position in which the plunger 68 holds the head 51 of the bolt 50 slightly spaced from the surface 59 of the member 60. Accordingly, fluid also can continue to flow into the first chamber 43.

The position of the valve body 65 is such that the desired pressure differential exists between the first chamber 43 and the second chamber 44. There is modulation of the valve body 65 in its slightly open position to insure that the predetermined pressure differential between the chambers 43 and 44 is maintained.

One suitable example of the four-stage compressor 10 is sold by Davey Compressor Company as model No. 1-MC11. One suitable example of the coolers 14, 17, 20, and 23 is sold by Young Radiator Co. as part No. 1666889. One suitable example of the traps 15, 18, and 21 is sold by Davey Compressor Co. as part No. 65618. One suitable example of the filter 30 is sold by Automatic Switch Co. as model No. 8600AZ. One suitable example of filters 32 and 34 is sold by Watts Regulators Co. as model No. 137-2. One suitable example of the separator 24 is sold by Areo-Dri Corp. as model No. MFL. One suitable example of the chemical dryers 26 and 27 is sold by Areo-Dri Corp. as model No. 82991.

An advantage of this invention is that it removes moisture from a multi-stage compressor without any loss in pressure and any requirement of external power. Another advantage of this invention is that a bleed valve can be utilized between pressure ambients of any difference without having any effect on the pressure at either ambient.

For purposes of exemplification, a particular embodiment of the invention has been shown and described according to the best present understanding thereof. However, it will be apparent that changes and modifications in the arrangement and construction of the parts thereof may be resorted to without departing from the scope of the invention.

What is claimed is:

1. A bleed valve for bleeding fluids between two ambients at different pressures including a housing, said housing having an inlet communicating with the ambient of higher pressure and an outlet communicating with the ambient of lower pressure, said housing having first and second chambers therein, said first chamber communicating with said inlet, said second chamber communicating with said outlet, control means in said housing to allow flow to said second chamber while maintaining a maximum predetermined pressure differential between said first and second chambers irrespective of the pressure differential between said inlet and said outlet, and said control means including flexible means separating said first chamber from said second chamber, passage means extending through said flexible means to provide communication therethrough, and means responsive to the position of said flexible means to control flow from said inlet to said first chamber and from said inlet to said second chamber without flowing through said first chamber.

2. The bleed valve according to claim 1 in which said responsive means of said control means includes means to provide communication of said inlet with said first chamber and of said inlet with said second chamber through said passage means without communicating through said first chamber and to stop communication of said inlet with said first chamber and of said inlet with said second chamber while providing communication of said first chamber with said second chamber through said passage means.

3. A bleed valve for bleeding fluids between two ambients at different pressures including a housing, said housing having an inlet communicating with the ambient of higher pressure and an outlet communicating with the ambient of lower pressure, said housing having first and second chambers therein, said first chamber communicating with said inlet, said second chamber communicating with said outlet, control means in said housing to allow flow to said second chamber while maintaining a maximum predetermined pressure differential between said first and second chambers irrespective of the pressure differential between said inlet and said outlet, said control means including flexible means separating said first chamber from said second chamber, passage means extending through said flexible means to provide communication therethrough, and means responsive to the position of said flexible means to control flow from said inlet to said first and second chambers, said responsive means of said control means including a valve responsive to the pressure at said inlet, said valve being unconnected to said flexible means, means movable in response to movement of said flexible means, and said movable means including means to maintain said valve in an open position to allow flow from said inlet to said first and second chambers.

4. A bleed valve for bleeding fluids between two ambients at different pressures including a housing, said housing having an inlet communicating with the ambient of higher pressure and an outlet communicating with the ambient of lower pressure, said housing having first and second chambers therein, said first chamber communicating with said inlet, said second chamber communicating with said outlet, control means in said housing to allow flow to said second chamber while maintaining a maximum predetermined pressure differential between said first and second chambers irrespective of the pressure differential between said inlet and said outlet, and said control means including flexible means separating said first chamber from said second chamber, passage means extending through said flexible means to provide communication therethrough, and means responsive to the position of said flexible means to control flow from said inlet to said first and second chambers, said responsive means of said control means includes a valve responsive to the pressure at said inlet, means movable in response to movement of said flexible means, and said movable means includes means to maintain said valve in an open position to allow flow from said inlet to said first and second chambers, said flexible means is a diaphragm, said passage means including means supported in said diaphragm and having a passage extending therethrough and having one end communicating with said second chamber, said supported means having means disposed in said first chamber and engaging said movable means, and said movable means having a passage therein with one end communicating with the other end of said passage in said supported means and its other end communicating with said inlet and said first chamber.

5. The bleed valve according to claim 4 including a member in said housing having a passage extending therethrough to provide communication between said inlet and said first chamber, said passage in said member having a seat for said valve, and said movable means being disposed in said passage in said member and having the other end of said passage therein communicating with said passage in said member.

6. A bleed valve for bleeding fluids between two ambients at different pressures including a housing, said housing having an inlet communicating with the ambient of higher pressure and an outlet communicating with the ambient of lower pressure, said housing having first and second chambers therein, said first chamber communicating with said inlet, said second chamber communicating with said outlet, control means in said housing to allow flow to said second chamber while maintaining a maximum predetermined pressure differential between said first and second chambers irrespective of the pressure differential between said inlet and said outlet, and said control means including flexible means separating said first chamber from said second chamber, passage means extending through said flexible means to provide communication therethrough, and means responsive to the position of said flexible means to control flow from said inlet to said first and second chambers, said responsive means and said flexible means being unconnected to each other.

7. The bleed valve according to claim 6 in which said responsive means of said control means includes a valve responsive to the pressure at said inlet, said valve is unconnected to said flexible means, means movable in response to movement of said flexible means, said movable means and said flexible means are unconnected to each other, said valve and said movable means are unconnected to each other, and said movable means includes means to maintain said valve in an open position to allow flow from said inlet to said first and second chambers.

* * * * *